US007920537B2

(12) United States Patent
Jones (10) Patent No.: US 7,920,537 B2
(45) Date of Patent: Apr. 5, 2011

(54) METHOD AND ARRANGEMENT FOR MITIGATION OF INTERCELL INTERFERENCE IN A CELLULAR COMMUNICATION SYSTEM

(75) Inventor: Alan Edward Jones, Calne (GB)

(73) Assignee: Wireless Technology Solutions LLC, New York, NY (US)

( * ) Notice: Subject to any disclaimer, the term of this patent is extended or adjusted under 35 U.S.C. 154(b) by 863 days.

(21) Appl. No.: 11/071,954

(22) Filed: Mar. 3, 2005

(65) Prior Publication Data

US 2005/0232195 A1 Oct. 20, 2005

(30) Foreign Application Priority Data

Mar. 8, 2004 (GB) .................................. 0405166.0

(51) Int. Cl.
*H04B 7/216* (2006.01)
*H04B 1/00* (2006.01)
*H04B 1/10* (2006.01)
(52) U.S. Cl. ........ 370/342; 370/335; 375/144; 375/147; 375/148; 375/346; 455/501; 455/63.1
(58) Field of Classification Search .................. 370/331, 370/335, 342; 455/501–506, 63.1–63.3, 455/67.13, 114.1–114.3; 375/346–351, 147–153, 375/144, 200, 208
See application file for complete search history.

(56) References Cited

U.S. PATENT DOCUMENTS 6,795,417 B2 *  9/2004  Zeira et al. .................... 370/335
6,934,271 B2     8/2005  Zeira et al.
6,961,395 B2 * 11/2005  Fuller et al. ................... 375/350
7,099,377 B2 *  8/2006  Berens et al. .................. 375/130
7,139,303 B2 * 11/2006  Jechoux et al. ................ 375/141
7,292,563 B1 * 11/2007  Wales ............................ 370/342
7,336,599 B2 *  2/2008  Hwang et al. ................. 370/208
7,428,278 B2 *  9/2008  Buchert et al. ................ 375/346

(Continued)

FOREIGN PATENT DOCUMENTS

EP        1 304 815         4/2003

(Continued)

OTHER PUBLICATIONS

"Universal Mobile Telecommunications System (UMTS); Spreading and Modulation (TDD) (3GPP TS 25.223 Version 5.0.0 Release 5)," (Mar. 2002). ETSI 125 223 v5.0.0:1-37.

(Continued)

*Primary Examiner* — Matthew Sams
(74) *Attorney, Agent, or Firm* — Fitch Even Tabin & Flannery (57) ABSTRACT

A method (400) and arrangement (200) for mitigation of intercell and intracell interference in a 3GPP cellular communication system (100) by, in a receiver in a cell of the system, deriving for a first channel in the cell a signal, representative of first channel transfer function ($A^{(1)}$); deriving for at least a second channel originating in a different cell a signal ($A^{(2\ \cdots\ M)}$), representative of second channel transfer function, based on: deriving a cell specific scrambling code (s), deriving a channel impulse response (h), and deriving a channelisation code (c); and performing multi-user detection using the first and second signals. Where the channelisation code is unknown, a substitute channelisation code is preferably substituted. It will be appreciated that the technique can be applied to both downlink and uplink. This provides the advantage that both intra-cell interference and intercell interference are mitigated.

36 Claims, 4 Drawing Sheets

U.S. PATENT DOCUMENTS

| | | | |
|---|---|---|---|
| 7,522,559 B2* | 4/2009 | Haim et al. | 370/332 |
| 7,684,371 B2* | 3/2010 | Haim et al. | 370/332 |
| 7,751,512 B2* | 7/2010 | Buchert et al. | 375/346 |
| 7,773,704 B2* | 8/2010 | Buchert et al. | 375/346 |
| 2002/0051433 A1 | 5/2002 | Affes et al. | |
| 2003/0210754 A1* | 11/2003 | Buchert et al. | 375/346 |
| 2003/0223398 A1* | 12/2003 | Haim et al. | 370/342 |
| 2004/0052236 A1* | 3/2004 | Hwang et al. | 370/342 |
| 2004/0116122 A1* | 6/2004 | Zeira et al. | 455/445 |
| 2004/0141548 A1* | 7/2004 | Shattil | 375/146 |
| 2004/0213186 A1* | 10/2004 | Masuda et al. | 370/335 |
| 2005/0111408 A1* | 5/2005 | Skillermark et al. | 370/331 |
| 2005/0232195 A1* | 10/2005 | Jones | 370/329 |
| 2005/0270991 A1* | 12/2005 | Pan et al. | 370/280 |
| 2007/0147309 A1* | 6/2007 | Brouwer | 370/335 |

FOREIGN PATENT DOCUMENTS

| | | |
|---|---|---|
| GB | 2 381 422 | 4/2003 |
| GB | 2397724 A | 7/2004 |
| WO | WO 01/58041 | 8/2001 |

OTHER PUBLICATIONS

Great Britain Search Report mailed Sep. 16, 2004, for Great Britain Application No. 0405166.0 filed Mar. 8, 2004, 3 pages.
3rd Generation Partnership Project, Technical Specification Group Radio Access Network, UTRAN overall description (release 6) 3GPP TS 25.401 V6.7.0 (Sep. 2005).
3rd Generation Partnership Project, Technical Specification Group Services and System Aspects, General Packet Radio Service (GPRS), Service Description, Stage 2 (Release 6) 3GPP TS 23.060 V6.11.0 (Dec. 2005).
3rd Generation Partnership Project, Technical Specification Group Radio Access Network, Physical channels and mapping of transport channels onto physical channels (TDD) (Release 6) 3GPP TS 25.221 V6.4.1 (Jun. 2005).
3rd Generation Partnership Project, Technical Specification Group Radio Access Network, Spreading and modulation (TDD) (Release 6) 3GPP TS 25.223 V6.0.0 (Dec. 2003).
Hooli et al., Personal, Indoor and Mobile Radio Communications (2002) The 13$^{th}$ IEEE International Symposium on Sep. 15-18, 2002, 3:1437-1441.
International Search Report for PCT/EP2005/050755, mailed on Jul. 4, 2005, 3 pages.
Klein et al., IEEE Trans. VT (1996) 45(2):276-287.
Hooli et al., Adaptive Channel Equalization in WCDMA Downlink in Soft Handover, PIMRC 2002, 2002 IEEE.
Translation of Office Action issued on October 10, 2008 from Chinese Patent Application No. 200580013105.X.
British Examination Report Under Section 18(3) from British Application No. GB0405166.0 dated Jul. 7, 2008.
International Preliminary Report on Patentabilitiy date Sep. 8, 2006 from International Application No. PCT/EP2005/050755.

* cited by examiner

METHOD AND ARRANGEMENT FOR MITIGATION OF INTERCELL INTERFERENCE IN A CELLULAR COMMUNICATION SYSTEM

CROSS-REFERENCE TO RELATED APPLICATIONS

This application claims the benefit of United Kingdom patent application number 0405166.0, filed Mar. 8, 2004, which is incorporated by reference in its entirety herein.

FIELD OF THE INVENTION

This invention relates to cellular communication systems and in particular to such systems employing Code Division Multiple Access (CDMA) technology.

BACKGROUND OF THE INVENTION

In the field of this invention it has long been recognized that a CDMA multiuser detector (MUD) can mitigate both intracell and intercell interference. One of the problems with mitigating intercell interference has always been the availability of information from the surrounding interfering cells. To enable a satisfactory level of performance, this information has to be timely and sufficiently accurate; if not, performance may be severely affected.

Unfortunately, however, in many CDMA systems gaining access to the required information is extremely difficult as it is normally carried in higher layer messaging, which is generally inaccessible as it is specific to the cell of interest only. Under this scenario, the usual assumption is made, which is that the MUD considers intracell interference only and intercell interference is treated as an additional noise source. The result is that performance suffers as a consequence.

A method and arrangement for mitigation of intercell interference in a cellular communication system would therefore be advantageous, wherein the abovementioned disadvantage(s) may be alleviated.

SUMMARY OF INVENTION

Accordingly, the Invention seeks to preferably mitigate, alleviate or eliminate one or more of the above mentioned disadvantages singly or in any combination.

In accordance with a first aspect of the present invention there is provided a method for mitigation of interference in a cellular communication system as claimed in claim 1.

In accordance with a second aspect of the present invention there is provided an arrangement for mitigation of interference in a cellular communication system as claimed in claim 14.

BRIEF DESCRIPTION OF THE DRAWING(S)

One method and arrangement for mitigation of intercell and intracell interference in a cellular communication system incorporating the present invention will now be described, by way of example only, with reference to the accompanying drawing(s), in which.

DESCRIPTION OF EXEMPLARY EMBODIMENT(S)

Figure 1:
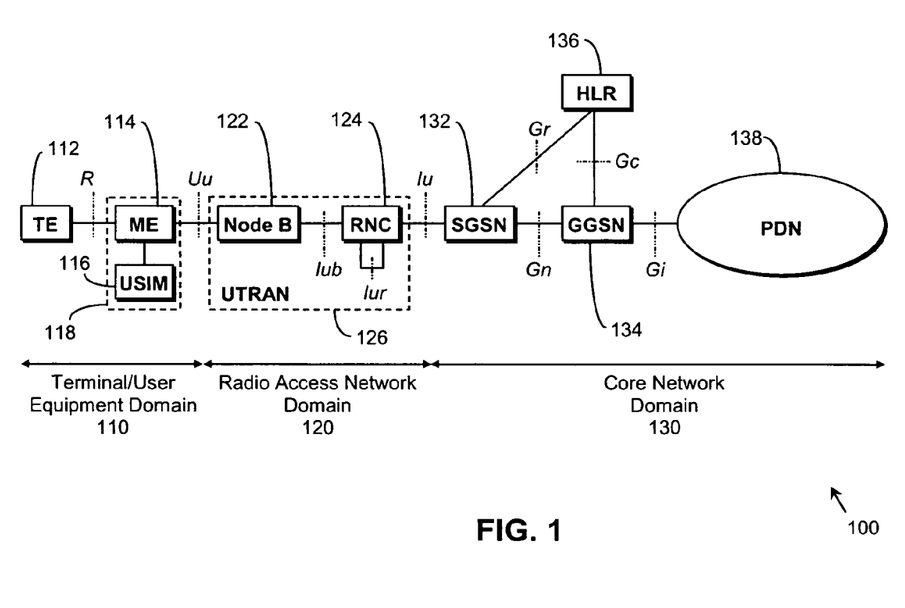
FIG. 1 shows a block schematic diagram illustrating a 3GPP radio communication system in which the present invention may be used.

The following preferred embodiment of the present invention will be described in the context of a UMTS Radio Access Network (UTRAN) system operating in TDD mode. Referring firstly to FIG. 1, a typical, standard UMTS Radio Access Network (UTRAN) system 100 is conveniently considered as comprising: a terminal/user equipment domain 110; a UMTS Terrestrial Radio Access Network domain 120; and a Core Network domain 130.

In the terminal/user equipment domain 110, terminal equipment (TE) 112 is connected to mobile equipment (ME) 114 via the wired or wireless R interface. The ME 114 is also connected to a user service identity module (USIM) 116; the ME 114 and the USIM 116 together are considered as a user equipment (UE) 118 (or more generally as a remote station). The UE 118 communicates data with a Node B (base station) 122 in the radio access network domain 120 via the wireless Uu interface. Within the radio access network domain 120, the Node B 122 communicates with a radio network controller (RNC) 124 via the Iub interface. The RNC 124 communicates with other RNC's (not shown) via the Iur interface. The Node B 122 and the RNC 124 together form the UTRAN 126. The RNC 124 communicates with a serving GPRS service node (SGSN) 132 in the core network domain 130 via the Iu interface. Within the core network domain 130, the SGSN 132 communicates with a gateway GPRS support node (GGSN) 134 via the Gn interface; the SGSN 132 and the GGSN 134 communicate with a home location register (HLR) server 136 via the Gr interface and the Gc interface respectively. The GGSN 134 communicates with public data network 138 via the Gi interface.

Thus, the elements RNC 124, SGSN 132 and GGSN 134 are conventionally provided as discrete and separate units (on their own respective software/hardware platforms) divided across the radio access network domain 120 and the core network domain 130, as shown in FIG. 1.

The RNC 124 is the UTRAN element responsible for the control and allocation of resources for numerous Node B's 122; typically 50 to 100 Node B's may be controlled by one RNC. The RNC also provides reliable delivery of user traffic over the air interfaces. RNC's communicate with each other (via the Iur interface) to support handover.

The SGSN 132 is the UMTS Core Network element responsible for Session Control and interface to the HLR. The SGSN keeps track of the location of an individual UE and performs security functions and access control. The SGSN is a large centralized controller for many RNCs.

The GGSN 134 is the UMTS Core Network element responsible for concentrating and tunnelling user data within the core packet network to the ultimate destination (e.g., internet service provider—ISP).

Such a UTRAN system and its operation are described more fully in the 3GPP technical specification documents 3GPP TS 25.401, 3GPP TS 23.060, and related documents, available from the 3GPP website at www.3gpp.org, and need not be described in more detail herein.

In this following description we describe a method of acquiring the necessary information that enables the operation of MUD (in a UE and/or a Node B) for mitigating both intracell and intercell interference. The method as described is based on the 3GPP TDD mode, but can also be readily applied to other communication systems. It will be appreciated that the invention can be applied to both uplink and downlink.

We first define the information that is required by the MUD for handling both intercell and intracell interference. We then go on to describe the process by which the information is gathered. Finally, we describe the overall method.

Let the number of cells be defined by M and suppose each cell has $K^{(m)}$ physical channels. A physical channel, k has an associated data sequence $$d_m^{(k)} = (d_{m,1}^{(k)}, d_{m,2}^{(k)}, \ldots, d_{m,N}^{(k)})^T, \text{ where } k=1 \ldots K^{(m)} \text{ and } m=1 \ldots M$$

where N is the number of data symbols and $(.)^T$ denotes transposition. Each data symbol, $d_{m,n}^{(k)}$, where n=1 ... N, is multiplied by a unique cell specific vector that is defined by $$x^{(k,m)} = c_{Q_k}^{(k)} s^{(m)}.$$

We represent the component wise product of $c_{Q_k}^{(k)} = (c_{Q_k,1}^{(k)}, \ldots, c_{Q_k,Q_k}^{(k)})^T$ and $s^{(m)} = (s_1^{(m)}, \ldots, s_L^{(m)})^T$ in the usual way as $c_{Q_k}^{(k)} s^{(m)}$, where $Q_k$ is the vector length, which is generally referred to as the spreading factor, and L is the length of the scrambling sequence.

A physical channel k in cell m has an associated channel impulse response $$h^{(k,m)} = (h_1^{(k,m)}, \ldots, h_W^{(k,m)})^T$$

and we define $$b^{(k,m)} = (b_1^{(k,m)}, b_2^{(k,m)}, \ldots, b_{Q_k+W-1}^{(k,m)})^T = x^{(k,m)} * h^{(k,m)}$$

where * denotes convolution. The received sequence is the sum of $$\sum_{m=1}^{M} K^{(m)}$$

sequences perturbed by an additive Gaussian noise sequence $$n = (n_1, n_2, \ldots, n_{NQ+W-1})^T$$

with zero mean and covariance matrix $R_n = E(nn^H)$. The received sequence is written as $$e = Ad + n$$

where $d = (d_1^T, d_2^T, \ldots, d_M^T)^T$, $d_m = (d_m^{(1)T}, d_m^{(2)T}, \ldots, d_m^{(K^{(m)})T})^T$ and the transfer function matrix $A = (A^{(1)T}, A^{(2)T}, \ldots, A^{(M)T})^T$ is given by $$A^{(m)} = (A_{ij}^{(m)}), \text{ where } i=1 \ldots NQ_k+W-1, j=1 \ldots K^{(m)} N, m=1 \ldots M$$

where $$A_{Q_k(n-1)+l,n+N(k-1)}^{(m)} = \begin{cases} b_l^{(k,m)} & k=1 \ldots K^{(m)}, n=1 \ldots N, l=1 \ldots Q_k+W-1, m=1 \ldots M \\ 0 & \text{else} \end{cases}$$

Supposing the UE is connected to cell m=1, for mitigating intracell interference only, the receiving side estimates the matrix $A^{(1)}$. For mitigation of intercell interference the remaining M−1 matrices are estimated, $A^{(2)}, \ldots, A^{(M)}$. For $A^{(1)}$, the receiver is always provided sufficient information, generally through higher layer signalling. Unfortunately, for cells m=2 ... M this information is not readily available to the receiver, since the required data is normally embedded in higher layer messages that are cell specific.

In the next section, we describe the method by which the receiver in cell m=1 acquires sufficient information to allow estimation of $A^{(2)}, \ldots, A^{(M)}$.

Thus, the following describes how a signal, in the form of a transfer function matrix, $A^{(m)}$, may be determined for a different cell m than the cell of the receiver. The transfer function matrix is determined in response to a first code, in the form of a cell specific scrambling code, a channel impulse response and a second code, in the form of a channelization code. It will be appreciated that scrambling code re-use may be utilized in the cellular communication system and that the cell specific scrambling code is not necessarily unique in the cellular communication system.

Information Acquisition

Although the following description of the preferred embodiment is specific to downlink operation, it will be appreciated to those skilled in the art that the same algorithm can also be applied to the uplink.

The matrix $A^{(m)}$ is constructed from the vector $b^{(k,m)}$, where $k=1 \ldots K^{(m)}$, which consists of three components, namely:

Cell specific scrambling code $s^{(m)}$.
Channel impulse response $h^{(k,m)}$.
Channelisation code $c_{Q_k}^{(k)}$.

It is straightforward to show that the above components can be replaced by equivalents from a conventional FDD (Frequency Division Duplex) CDMA system, namely the channelisation code and cell specific scrambling code in the context of PN (Pseudo-random Noise) processing.

Hence, by finding the three components that make up $b^{(k,m)}$ we also have all of the components for constructing the matrix $A^{(m)}$. We describe how the receiver acquires these three components for the case where m=2 ... M, i.e. the intercell interference case.

Figure 2:
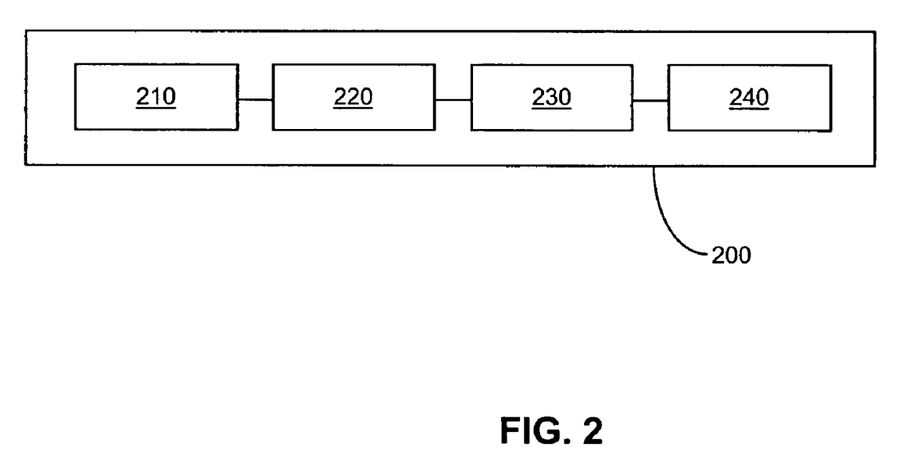
FIG. 2 shows a block schematic diagram illustrating a multi-user detector (MUD) utilizing the present invention.

As shown in FIG. 2, a multi-user detector 200 (which may reside in the receiver in a UE and/or a Node B) comprises a module 210 for deriving first code which specifically is a cell specific scrambling code $s^{(m)}$, a module 220 for deriving a channel impulse response $h^{(k,m)}$, and a module 230 for deriving a second code which specifically is a channelisation code $c_{Q_k}^{(k)}$, and a module 240 for performing MUD on all M cells.

Cell Specific Scrambling Code $s^{(m)}$

As part of the handover procedure, the UE is required to continually monitor neighbor cells. Information to support this activity is provided by higher layers in terms of the broadcast signal, which is always transmitted in all cells. This information takes the form of an intra-frequency neighbor list, which is essentially a list of cell identifiers. The cell identifier is referred to as the cell parameter and in 3GPP its value takes on the range 0 ... 127 (see 3GPP technical specification document 3GPP TS 25.223, available from the 3GPP website at www.3gpp.org). The maximum number of intra-frequency cells on the neighbor list is 32, which implies 31 neighbor cells. Typically in 3GPP, the number of cell parameters defined on the list is M=10, and in this instance we have 9 neighbor cells, or potentially 9 intercell interferers. For simplicity, we assume throughout that the cell parameter corresponding to the UE connected cell is mapped to m=1.

As well as identifying an intra-frequency cell, the cell parameter is also used to provide, albeit indirectly, additional information that enables support for physical layer measurements. Each cell parameter has an association with a unique cell specific scrambling code $s^{(m)}$ and a unique cell specific basic midamble code $m^{(m)}$. In the context of 3GPP, the mapping between cell parameter, cell specific scrambling code and cell specific basic midamble code is defined in 3GPP technical specification document 3GPP TS 25.223, available from the 3GPP website at www.3gpp.org.

Thus, in some embodiments, a neighbor list may be determined for a given cell and the neighbor cells are defined by cell identifiers. In embodiments where there is a mapping between cell identifiers and cell specific scrambling codes, the cell specific scrambling code for a different cell may simply be determined from the cell identifier of the neighbor list provided within the current cell.

Similarly, in embodiments where there is a mapping between cell identifiers and basic midamble codes, the basic midamble code used in a different cell may simply be determined from the cell identifier of the neighbor list provided within the current cell.

It will be appreciated that cell specific scrambling codes and/or basic midamble codes may be reused within a cellular communication system but that these will typically be unique within a reuse pattern thus allowing receivers to differentiate signals from different cells by the scrambling code and/or midamble.

It will be understood that a similar process can also be applied for the uplink case. Here the network manager provides a neighbor list of interfering cells to the base station receiver.

Channel Impulse Response $h^{(k,m)}$

Figure 3:
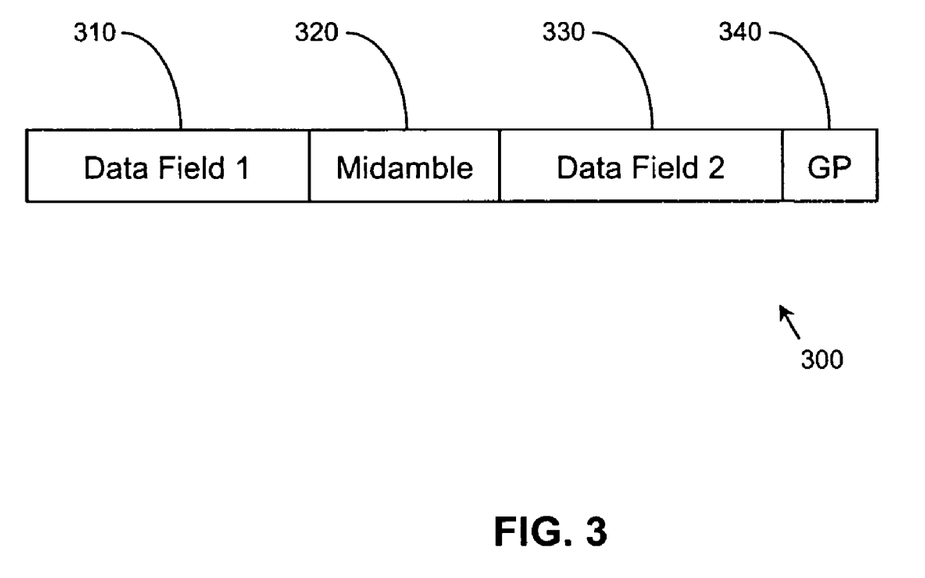
FIG. 3 shows a block schematic diagram illustrating a data burst in the system of FIG. 1.

As shown in FIG. 3, a 3GPP burst 300 consists of two data symbol fields 310 and 330, a midamble sequence 320, and a guard period 340. Further details of burst constructions for 3GPP are given in 3GPP technical specification document 3GPP TS 25.221, available from the 3GPP website at www.3gpp.org, and need not be described further herein.

It will be appreciated that although the current description focuses on an embodiment for a UMTS cellular communication system wherein midamble sequences are included in transmissions, other training data sequences may e.g. be used in other embodiments. For example, in some embodiments postambles and/or preambles may alternatively or additionally be used.

The midamble sequence is constructed by taking a shifted version of the cell specific basic midamble code $m^{(m)}$. This process is defined in 3GPP technical specification document 3GPP TS 25.221, available from the 3GPP website at www.3gpp.org, and need not be described further herein.

As previously described, the basic midamble code $m^{(m)}$ for a neighbor cell may be determined from the corresponding cell identifier of the neighbor list of the current cell.

The maximum number of simultaneous midamble sequences supported in a time slot is defined by the parameter $K_{cell}$. In 3GPP TDD mode (see 3GPP technical specification document 3GPP TS 25.221, available from the 3GPP website at www.3gpp.org) there are five values of $K_{cell}$ defined: 16, 8, 4, 6 and 3. The receiver is required to provide a channel estimate for all m cells. As described, the information required to perform this task is again provided through the cell identifier (cell parameter) in terms of the cell specific basic midamble code $m^{(m)}$.

The process of channel estimation requires the convolution of the received midamble sequence with the cell specific basic midamble code $m^{(m)}$. These techniques are well known and can be found in the published literature. The algorithm employed for channel estimation is used for all M cells. For cell m, the channel estimator is programmed with the cell specific base code $m^{(m)}$. The channel impulse response $h^{(k,m)}$ is derived by correlating the received midamble sequence with the cell specific basic midamble code $m^{(m)}$.

Thus, the receiver may initially determine the basic midamble code $m^{(m)}$ for a different cell from the cell identifier of the neighbor list in the current cell. The midamble sequence of a received signal is then convoluted with this basic midamble code $m^{(m)}$ resulting in a channel estimate (channel impulse response).

Channelisation Code $c_{Q_k}^{(k)}$

The channelisation codes used in the M−1 cells are obtained by using a predefined association between midamble sequences and indexes of channelisation codes. This mapping is known to the receiver a priori.

In particular, the receiver may first determine the basic midamble code $m^{(m)}$ for a different cell. It may then proceed to determine the actual midamble sequence for the specific channel and finally may determine the channelisation code from a known mapping between midamble sequences and channelisations codes. The midamble sequence of the specific channel may be determined from the convolution of the basic midamble code $m^{(m)}$ with the received signal.

Specifically, as the possible midamble sequences correspond to shifted versions of the basic midamble code $m^{(m)}$, the convolution may provide an indication of the offset between the current midamble sequence and the basic midamble code $m^{(m)}$ thereby allowing the midamble sequence to be determined. The receiver may thus convolute the received signal with the received signal for all possible offsets corresponding to all possible midamble sequences. If the convolution for a given offset results in a value above a given threshold, this indicates that the corresponding midamble sequence is present in the received signal. If the convolution results in a value below the threshold, this indicates that the corresponding midamble sequence is not present in the received signal. Thus, the individual midamble sequences of a group may be detected based on a convolution using the basic midamble code $m^{(m)}$.

The convolution used to determine the midamble sequence may specifically be the same used to determine the channel estimate.

In more detail, the presence of a midamble sequence in the received signal may also signify the presence of its associated channelisation codes. In the context of 3GPP this association is referred to as default midamble allocation scheme, the associations being defined in 3GPP technical specification document 3GPP TS 25.221, available from the 3GPP website at www.3gpp.org. There are 5 mappings defined in this document and each mapping is referred to as $K_{cell}$, where the $K_{cell}$ parameter is cell specific. In the context of this preferred embodiment it is assumed that $K_{cell}$ is also applied network-wide.

The $K_{cell}$ parameter can take on 5 values: 16, 8, 4, 6 and 3. The value of $K_{cell}$ refers to the maximum number of simultaneous midamble sequences per time slot. The relationship (as defined in 3GPP technical specification document 3GPP TS 25.221, available from the 3GPP website at www.3gpp.org) between channelisation code indexes, $K_{cell}$, and midamble sequence numbers, is given in Table 1 below for the downlink case. It will be understood that a similar table also exists for the uplink (UL) case.

TABLE 1

| $K_{cell}$ | \multicolumn{16}{c}{Channelisation Code Index} |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| 16 | 1 | 9 | 2 | 10 | 3 | 11 | 6 | 14 | 5 | 13 | 4 | 12 | 7 | 15 | 8 | 16 |
| 8 | 1 | 1 | 2 | 2 | 3 | 3 | 6 | 6 | 5 | 5 | 4 | 4 | 7 | 7 | 8 | 8 |
| 4 | 1 | 1 | 1 | 1 | 3 | 3 | 3 | 3 | 5 | 5 | 5 | 5 | 7 | 7 | 7 | 7 |
| 6 | 1 | 1 | 5 | 5 | 3 | 3 | 3 | 3 | 2 | 2 | 6 | 6 | 4 | 4 | 4 | 4 |
| 3 | 1 | 1 | 1 | 1 | 3 | 3 | 3 | 3 | 2 | 2 | 2 | 2 | 2 | 2 | 2 | 2 |

EXAMPLE

Suppose $K_{cell}=4$ and midamble sequence 3 is detected. Then according to the above table channelisation codes 5, 6, 7 and 8 could potentially be present. Since a midamble sequence has been detected then in accordance with 3GPP technical specification document 3GPP TS 25.221, available from the 3GPP website at www.3gpp.org, at least one channelisation code must also be present. From this document this channelisation code is the lowest index in the allowed set of channelisation codes, and this is referred to as the primary code. In the above example, the primary code is channelisation code with index number 5.

Thus, the detection of a specific midamble sequence in a signal will directly indicate a group of channelisation codes which may have been used for the channel.

It is clear that for $K_{cell}$ equal to 16 a unique mapping exists between each midamble sequence and each channelisation code $c_{Q_k}^{(k)}$. Thus, for this example, the identification of the channelisation code may simply follow from the determination of the specific midamble sequence that was used in the transmission.

However, such a unique mapping occurs only for $K_{cell}$ being equal to 16. For other values the midamble sequence is common to a plurality of the channelisation codes which associated with the neighbor cell. Specifically, for $K_{cell}$ equal to 8, 4, 6 and 3, the above example illustrates that a unique mapping only exists between the primary channelisation code and the midamble sequence. Returning to the above example, at this stage we have no other information at our disposal and so we are left with uncertainty over the presence of channelisation codes 6, 7, and 8.

In some embodiments, the transfer function matrix $A^{(m)}$ may be constructed with all channelisation codes associated with the active midamble sequences. However, if the channelisation codes are not present a performance degradation will result. Another possibility is to restrict the value of $K_{cell}$ to 16.

In the following a further option is described which provides improved performance in many embodiments. Thus, the section below provides a solution to the problem while supporting all $K_{cell}$ values.

In the example, a common substitute code is derived which is used to generate the transfer function matrix rather than using the specific channelisation code directly. The common substitute code is in the following referred to as a tentative channelisation code.

Tentative Channelisation Codes

The channelisation codes employed in 3GPP (see 3GPP technical specification document 3GPP TS 25.223, available from the 3GPP website at www.3gpp.org) exhibit a high degree of structure, which arises from the requirement of orthogonality preservation at different spreading factors. Using this inherent structure we are able to construct substitute channelisation codes based on the primary channelisation code. Thus, substitute channelisation codes that exploits characteristics of the relationship between different channelisation codes in a group may be used to provide a useful code for the generation of the transfer function matrix.

In particular, a substitute code which has a spreading factor lower than the primary channelisation code is used. The lower spreading factor allows a code to be selected which is common to the channelisation codes of the group thereby allowing a transfer function matrix to be generated which allows efficient multi user detection.

Table 2 below details the relationship between $K_{cell}$, midamble sequence and tentative code spreading factor.

TABLE 2

| $K_{cell}$ | \multicolumn{16}{c}{Midamble Sequence} |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| 16 | 16 | 16 | 16 | 16 | 16 | 16 | 16 | 16 | 16 | 16 | 16 | 16 | 16 | 16 | 16 | 16 |
| 8 | 8 | 8 | 8 | 8 | 8 | 8 | 8 | 8 | — | — | — | — | — | — | — | — |
| 4 | 4 | 4 | 4 | 4 | — | — | — | — | — | — | — | — | — | — | — | — |
| 6 | 8 | 8 | 4 | 4 | 8 | 8 | — | — | — | — | — | — | — | — | — | — |
| 3 | 4 | 2 | 4 | — | — | — | — | — | — | — | — | — | — | — | — | — |

Like the primary channelisation code, the tentative channelisation code is derived from the Orthogonal Variable Spreading Factor (OVSF) tree defined in 3GPP technical specification document 3GPP TS 25.223, available from the 3GPP website at www.3gpp.org. The index of the tentative channelisation code is derived from both the primary channelisation code index and the spreading factor of the tentative channelisation code. The index is given by the following formula $$k_t = \frac{Q_t}{16} \times (k_p - 1) + 1$$

where $Q_t$ is the spreading factor of the tentative channelisation code and $k_p$ is the index of the primary channelisation code. Given the code index and spreading factor, the tentative channelisation code is obtained.

The channelisation code sequences which are associated with a particular midamble sequence are now replaced with the associated tentative channelisation code time shifted. We write $$c_{Q_k,q}^{(k)} \Rightarrow \begin{cases} c_{Q_t,i}^{(k_t)} & i = 1, \ldots, \frac{16}{Q_t}, q = (k - k_p) \times \frac{16}{Q_t} + i \\ 0 & \text{else} \end{cases}$$

As can be seen, the modified version of $c_{Q_k}^{(k)}$ is still the same length, but the number of non-zero elements is equal to the length of the tentative channelisation code $Q_t$. The remaining elements of $c_{Q_k}^{(k)}$ are replaced with zeros. For the previous example, in the context of 3GPP technical specification documents 3GPP TS 25.223 and 3GPP TS 25.221, available from the 3GPP website at www.3gpp.org, the mapping is given below, $$(c_{16}^{(5)}, c_{16}^{(6)}, c_{16}^{(7)}, c_{16}^{(8)}) = \begin{pmatrix} 1 & 1 & 1 & 1 \\ 1 & 1 & 1 & 1 \\ -1 & -1 & -1 & -1 \\ -1 & -1 & -1 & -1 \\ 1 & 1 & -1 & -1 \\ 1 & 1 & -1 & -1 \\ -1 & -1 & 1 & 1 \\ -1 & -1 & 1 & 1 \\ 1 & -1 & 1 & -1 \\ 1 & -1 & 1 & -1 \\ -1 & 1 & -1 & 1 \\ -1 & 1 & -1 & 1 \\ 1 & -1 & -1 & 1 \\ 1 & -1 & -1 & 1 \\ -1 & 1 & 1 & -1 \\ -1 & 1 & 1 & -1 \end{pmatrix} \Rightarrow \begin{pmatrix} 1 & 0 & 0 & 0 \\ 1 & 0 & 0 & 0 \\ -1 & 0 & 0 & 0 \\ -1 & 0 & 0 & 0 \\ 0 & 1 & 0 & 0 \\ 0 & 1 & 0 & 0 \\ 0 & -1 & 0 & 0 \\ 0 & -1 & 0 & 0 \\ 0 & 0 & 1 & 0 \\ 0 & 0 & 1 & 0 \\ 0 & 0 & -1 & 0 \\ 0 & 0 & -1 & 0 \\ 0 & 0 & 0 & 1 \\ 0 & 0 & 0 & 1 \\ 0 & 0 & 0 & -1 \\ 0 & 0 & 0 & -1 \end{pmatrix}$$

where $Q_t=4$, $k_p=5$, and $K_{cell}=4$.

Thus, the receiver may determine the scrambling code, the channel impulse response and the channelisation code (or substitute code) for neighbor cells based only on information available within the current cell. This allows the receiver to determine the channel transfer matrix for neighbor cells and accordingly the receiver has sufficient information to perform MUD on all M cells for all values of $K_{cell}$. Accordingly, significantly improved interference mitigation may be achieved without requiring additional information to be communicated between cells.

If required, the detected symbols can be reconstructed at the output of the MUD using the principle of OVSF code decimation, as described in GB patent application 0125484.6.

It will be understood that tentative channelisation codes may be derived by estimating neighbor cell interfering codes using a predefined mapping, on the basis that the interferers from the neighbor cells are considered active if their received midamble power exceeds a predefined threshold.

Application to Broadcast/multicast Transmissions

When downlink broadcast or multicast transmissions are applied network-wide for common subscriber services, and the same physical parameters are used throughout, the Use know a priori sufficient information for enabling MUD of intercell and intracell interference. At this stage the UE can combine or select the optimum signal from common information acquired from more than one cell, since the same information is transmitted in all cells. It will be appreciated by those skilled in the art that the method and techniques described here are equally applicable in this instance.

Method

Figure 4:
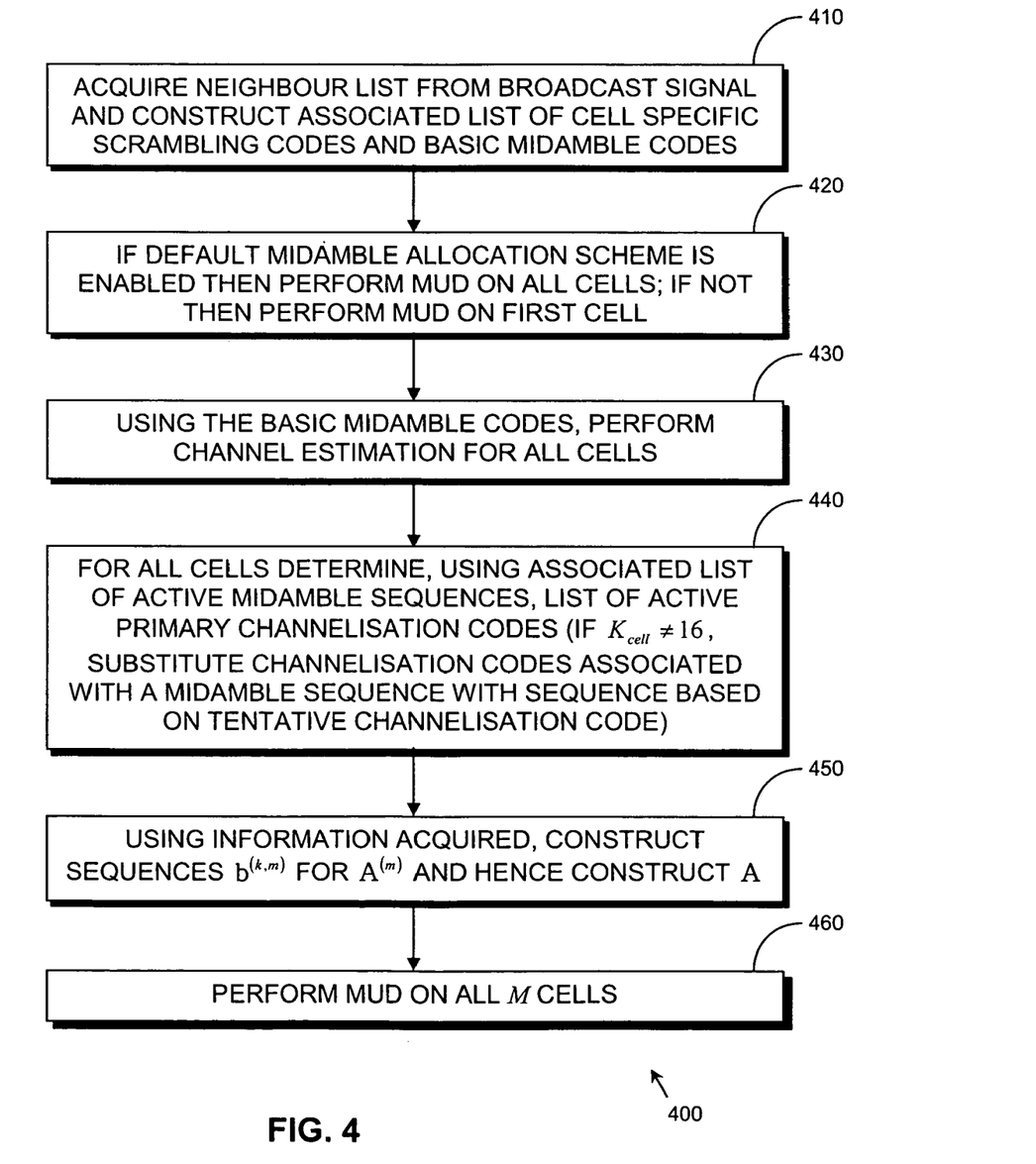
FIG. 4 shows a block schematic diagram illustrating a method, performed in the MUD of FIG. 2, for mitigating intracell and intercell interference in the system of FIG. 1.

Referring now also to FIG. 4, the method 400 of MUD on M cells is based on the following series of steps, the step numbers being those illustrated in the figure:

410—The receiver acquires the neighbour list from the broadcast signal and constructs the associated list of cell specific scrambling codes $s^{(m)}$ and basic mixable codes $m^{(m)}$. The cell specific scrambling codes $s^{(m)}$ and basic mixable codes $m^{(m)}$ are specifically determined from cell identifiers of the neighbour list.

420—If default mixable allocation scheme is enabled then MUD on M cells is performed. If not then MUD on cell m=1 is performed. It will be understood that other mappings may exist, the default midamble allocation scheme described herein being one example.

430—Using the basic midamble codes $m^{(m)}$, the receiver performs channel estimation for all M cells. Each cell produces $K_{cell}$ channel estimates. For cell m a Boolean vector of length $K_{cell}$ defines the presence of an active midamble sequence, where 1 signifies active and 0 inactive. The presence of a midamble sequence is determined by comparing the power in the associated channel estimate with a predefined threshold.

440—For cell m, the list of active primary channelisation codes is determined using the associated list of active midamble sequences. The association of channelisation codes $c_{Q_k}^{(k)}$ with midamble sequences is known to the receiver a priori through predefined mappings. The active channelisation codes are determined for all m.

If $K_{cell}$ is not equal to 16, the receiver substitutes channelisation codes associated with a midamble sequence with a sequence which is based on a tentative channelisation code.

450—Using the information acquired from the above steps the receiver has sufficient information to construct the sequences $b^{(k,m)}$ for the transfer function matrix $A^{(m)}$ of cell m and hence constructs the combined transfer function matrix A.

460—The receiver performs MUD on all M cells based on the combined transfer function matrix A. An example of MUD is provided in the publication by Klein, A., Kaleh, G. K., and Baier, P. W.; 'Zero Forcing and Minimum Mean-Square-Error Equalization for Mutliuser Detection in Code-Division Multiple-Access Channels', IEEE Trans VT, VOL. 45, No. 2, May 1996, pp276-287.

It will be appreciated that the method described above for mitigation of intercell interference in a cellular communication system may be carried out in software running on processors (not shown) in the transmitter(s) and/or the UE, and that the software may be provided as a computer program element carried on any suitable data carrier (also not shown) such as a magnetic or optical computer disc.

It will be also be appreciated that the method described above for mitigation of intercell interference in a cellular communication system may alternatively be carried out in hardware, for example in the form of an integrated circuit (not shown) such as an FPGA (Field Programmable Gate Array) or ASIC (Application Specific Integrated Circuit).

It will be understood that the method and arrangement for mitigation of intercell interference in a cellular communication system described above provides the advantage that intercell, as well as intracell, interference is mitigated.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality.

The invention claimed is:

1. A method for mitigation of interference in a cellular communication system, comprising:
   in a receiver in a cell of a system,
      deriving for a first channel in the cell a first signal representative of a first channel transfer function;
      deriving for at least a second channel originating in a different cell a second signal representative of a second channel transfer function, wherein the second signal includes a first code and a second code, and deriving the second signal includes:
         deriving the first code,
         deriving a channel impulse response,
         deriving a training data sequence common to a plurality of channelisation codes associated with the different cell in response to receiving a cell identifier, and deriving the second code comprising a tentative code in place of determining an actual channelisation code used in the different cell from among the plurality of channelisation codes, wherein the tentative code has a lower spreading factor than the actual channelisation code to enable more computationally efficient multi-user detection when the training data sequence does not have a unique mapping with the actual channelisation code; and
      performing multi-user detection using the first signal and the second signal.

2. The method of claim 1 wherein the first code comprises a cell specific scrambling code.

3. The method of claim 1 wherein the second signal comprises a transfer function matrix indicative of transfer functions for a plurality of channels originating in the different cell.

4. The method of claim 1 wherein deriving the first code comprises deriving the first code in response to receiving the cell identifier of the different cell.

5. The method of claim 4 further comprising deriving the cell identifier from a received neighbour list.

6. The method of claim 1 wherein deriving the channel impulse response comprises determining the channel impulse response in response to the training data sequence.

7. The method of claim 1 wherein deriving the second code comprises deriving the second code in response to receiving the cell identifier of the different cell.

8. The method of claim 1 further comprising determining a base training data sequence in response to receiving the cell identifier and determining the training data sequence in response to a correlation between the base training data sequence and a received signal.

9. The method of claim 1 wherein the second code is determined in response to a unique mapping between the training data sequence and the second code.

10. The method of claim 1 wherein the tentative code has a lower spreading factor than the plurality of channelisation codes.

11. The method of claim 1 wherein deriving the first code comprises deriving the first code from an associated broadcast cell parameter.

12. The method of claim 1, wherein the deriving the second code comprises deriving the tentative code.

13. The method of claim 12 wherein deriving the tentative code comprises estimating neighbour cell interfering codes using a predefined mapping.

14. The method of claim 1 further comprising combining and selecting common information acquired from more than one cell.

15. The method of claim 1 wherein the system is a Universal Mobile Telecommunication System (UMTS).

16. The method of claim 1 wherein the system is a $3^{rd}$ Generation Partnership Project (3GPP) system.

17. A non-transitory computer program element comprising computer program means for performing the method of claim 1.

18. An integrated circuit for performing the method of claim 1.

19. The method of claim 1, wherein deriving the second signal comprises deriving based only on data available from the cell.

20. The method of claim 1, wherein the deriving the second code comprising the tentative code in place of determining the actual channelisation code comprises time shifting the tentative code.

21. An arrangement for use in a receiver for mitigation of interference in a cellular communication system, comprising:
   first means for deriving for a first channel in a cell of the system a first signal representative of a first channel transfer function;
   second means for deriving for at least a second channel originating in a different cell a second signal representative of a second channel transfer function, wherein the second signal includes a first code and a second code, and the second means for deriving comprises:
      deriving the first code,
      deriving a channel impulse response, deriving a training data sequence that is common to a plurality of channelisation codes associated with the different cell in response to receiving a cell identifier, and deriving the second code comprising a tentative code in place of determining an actual channelisation code used in the different cell from among the plurality of channelisation codes, wherein the tentative code has a lower spreading factor than the actual channelisation code to enable more computationally efficient multi-user detection when the training data sequence does not have a unique mapping with the actual channelisation code; and means for performing multi-user detection using the first signal and the second signal.

22. The arrangement of claim 21 wherein the first code comprises a cell specific scrambling code.

23. The arrangement of claim 21 wherein the second signal comprises a transfer function matrix indicative of transfer functions for a plurality of channels originating in the different cell.

24. The arrangement of claim 21 wherein the second means is arranged to derive the first code in response to receiving a cell identifier of the different cell.

25. The arrangement of claim 24 further comprising means for deriving the cell identifier from a received neighbour list.

26. The arrangement of claim 21 wherein the second means is arranged to derive the channel impulse response in response to the training data sequence.

27. The arrangement of claim 21 wherein the second means is arranged to derive the second code in response to receiving a cell identifier of the different cell.

28. The arrangement of claim 21 wherein the second means further comprises means for determining a base training data sequence in response to the cell identifier and for determining the training data sequence in response to a correlation between the base training data sequence and a received signal.

29. The arrangement of claim 21 wherein the second means is arranged to determine the second code in response to a unique mapping between the training data sequence and the second code.

30. The arrangement of claim 21 wherein the tentative code has a lower spreading factor than the plurality of channelisation codes.

31. The arrangement of claim 21 wherein the second means for deriving comprises means for deriving the first code from an associated broadcast cell parameter.

32. The arrangement of claim 21 comprised in a base station of the communication system.

33. The arrangement of claim 21 comprised in a remote station of the communication system.

34. The arrangement of claim 21 wherein the system is a UMTS system.

35. The arrangement of claim 21 wherein the system is a 3GPP system.

36. The arrangement of claim 21, wherein the second means is configured to derive the second signal based only on data available from the cell.

* * * * *

UNITED STATES PATENT AND TRADEMARK OFFICE
CERTIFICATE OF CORRECTION

PATENT NO. : 7,920,537 B2
APPLICATION NO. : 11/071954
DATED : April 5, 2011
INVENTOR(S) : Alan Edward Jones It is certified that error appears in the above-identified patent and that said Letters Patent is hereby corrected as shown below:

IN THE CLAIMS

Column 12, Claim 12, Line 32; Change "wherein the" to -- wherein --; and

Column 12, Claim 20, Line 52; Change "wherein the" to -- wherein --.

Signed and Sealed this
Twenty-eighth Day of June, 2011

David J. Kappos
*Director of the United States Patent and Trademark Office*